(12) United States Patent
Imamura

(10) Patent No.: US 8,102,081 B2
(45) Date of Patent: Jan. 24, 2012

(54) ELECTRONIC APPARATUS

(75) Inventor: Akira Imamura, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 200 days.

(21) Appl. No.: 12/391,923

(22) Filed: Feb. 24, 2009

(65) Prior Publication Data

US 2009/0244833 A1 Oct. 1, 2009

(30) Foreign Application Priority Data

Mar. 31, 2008 (JP) .................................. 2008-093646

(51) Int. Cl.
*H01H 47/00* (2006.01)
(52) U.S. Cl. .................................. 307/132 EA
(58) Field of Classification Search ............. 307/132 EA
See application file for complete search history.

(56) References Cited

U.S. PATENT DOCUMENTS

| 5,721,542 | A | * | 2/1998 | Shpater | ............... | 341/23 |
| 2001/0048247 | A1 | * | 12/2001 | Bae et al. | ............... | 307/112 |
| 2006/0109258 | A1 | | 5/2006 | Takisawa | | |
| 2006/0112409 | A1 | * | 5/2006 | Yoon | ............... | 725/75 |
| 2006/0186359 | A1 | | 8/2006 | Suzukawa | | |
| 2009/0261088 | A1 | * | 10/2009 | Isoda et al. | ............... | 219/489 |

FOREIGN PATENT DOCUMENTS

| CN | 1455612 A | 11/2003 |
| CN | 1578544 A | 2/2005 |
| JP | 62-154549 | 7/1987 |
| JP | 2003/188971 A | 7/2003 |
| JP | 2004/227222 A | 8/2004 |
| JP | 2005/251218 A | 9/2005 |
| JP | 2006-236774 | 9/2006 |
| JP | 2008-053050 | 3/2008 |

OTHER PUBLICATIONS

Explanation of Non-English Language Reference(s).
An English Translation of Notification of Reasons for Rejection mailed by Japan Patent Office for Japanese Patent Application No. 2008-093646 on May 19, 2009.
Notification of the First Office Action issued by State Intellectual Property Office of P.R.C. on Dec. 14, 2010 in the corresponding Chinese patent application No. 200910003163.4.
Notification of Reasons for Rejection mailed by Japan Patent Office for Japanese Patent Application No. 2008-093646 on Oct. 20, 2009, in 5 pages.

* cited by examiner

*Primary Examiner* — Robert L. Deberadinis
(74) *Attorney, Agent, or Firm* — Knobbe Martens Olson & Bear, LLP

(57) ABSTRACT

According to one embodiment, an electronic apparatus includes a cabinet having an outer surface and an inner surface, a plurality of operation button display portions formed on the outer surface of the cabinet, a touchpad which is provided on the inner surface of the cabinet in confrontation with the operation button display portions and configured to detect an input operation of the operation button display portions, a plurality of light sources which are disposed on the inner surface side of the cabinet in confrontation with the operation button display portions and illuminate the respective operation button display portions, a light source controller which is configured to change an illumination state of the light sources for a predetermined time in response to the input operation and thereafter returns the illumination state to an original illumination state.

8 Claims, 4 Drawing Sheets

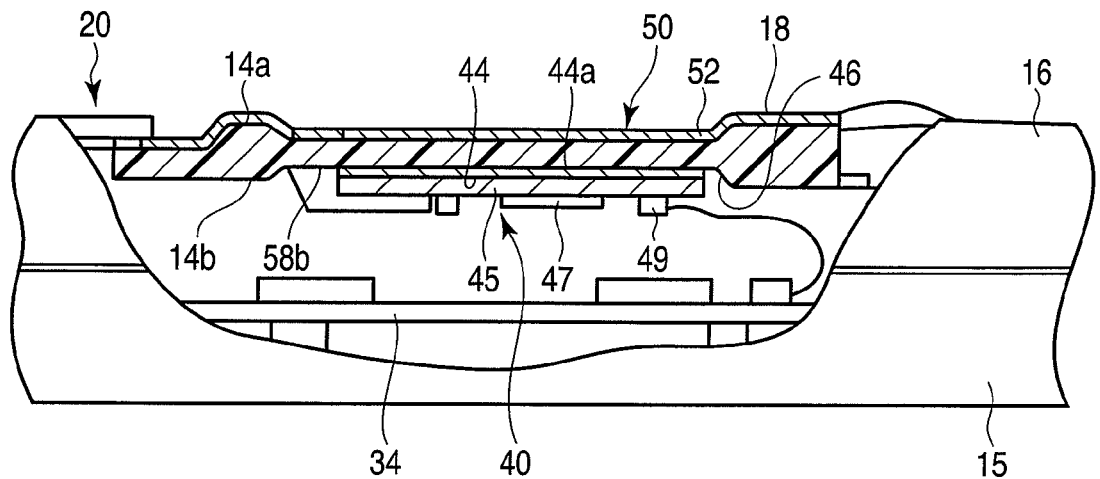
F I G. 2
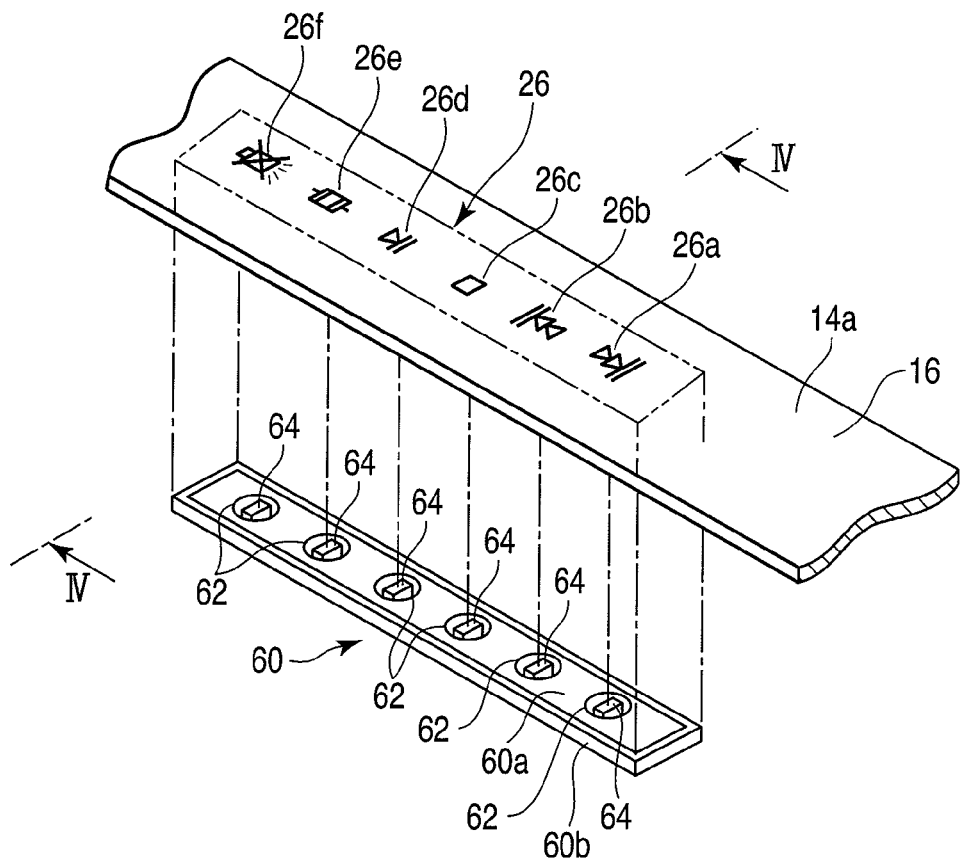
F I G. 3

| | Default | | Contact state of finger |
|---|---|---|---|
| ON/OFF setting of LED | ON | OFF | |
| Illumination state of LED | ON | OFF | Contact |
| | ↓ 0sec | ↓ 0sec | Contact |
| | OFF 1sec | OFF 1sec | Non-contact |
| | ↓ 1sec | ↓ 1sec | Non-contact |
| | ON | ON | Non-contact |

ELECTRONIC APPARATUS

CROSS-REFERENCE TO RELATED APPLICATIONS

This application is based upon and claims the benefit of priority from Japanese Patent Application No. 2008-093646, filed Mar. 31, 2008, the entire contents of which are incorporated herein by reference.

BACKGROUND

1. Field

An embodiment of the present invention relates to electronic apparatuses having function input keys for selecting and performing various functions.

2. Description of the Related Art

A portable notebook personal computer (hereinafter, referred to as notebook PC), for example, as an electronic apparatus has a cabinet that forms an outside wall and an input device provided at the cabinet. As disclosed in Jpn. Pat. Appln. KOKAI Publication No. 2004-227222, for example, there are a pointing device, which inputs information using a sheet for sensing an electrostatic capacity, a touch panel for inputting information using a pressure-sensitive film for sensing pressure, and the like, as the input device.

The notebook PC has a keyboard and function keys provided on an upper surface of the cabinet as input devices, the function keys selecting and performing various functions. Ordinarily, these function keys are formed of mechanical button switches and turned on and off when the keys are depressed.

The mechanical button switches are disposed on a substrate arranged in the cabinet, and are exposed to the outside through openings formed in the cabinet. However, when a plurality of openings are formed in the cabinet to expose the button switches as described above, a degree of freedom of design of equipment is lowered.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 2 is an exemplary side elevational view showing the personal computer with a part thereof broken out;

FIG. 3 is an exemplary exploded perspective view showing an operation button display unit and a touchpad of the personal computer;

DETAILED DESCRIPTION

Various embodiments according to the invention will be described hereinafter with reference to the accompanying drawings. In general, according to one embodiment of the invention, an electronic apparatus comprises: a cabinet having an outer surface and an inner surface; a plurality of operation button display portions formed on the outer surface of the cabinet; a touchpad which is provided on the inner surface of the cabinet in confrontation with the operation button display portions and configured to detect an input operation of the operation button display portions; a plurality of light sources which are disposed on the inner surface side of the cabinet in confrontation with the operation button display portions and illuminate the respective operation button display portions; a light source controller which is configured to change an illumination state of the light sources for a predetermined time in response to the input operation and thereafter returns the illumination state to an original illumination state.

An embodiment, which is applied to a portable computer as an electronic apparatus of the present invention, will be explained in detail with reference the accompanying drawings.

Figure 1:
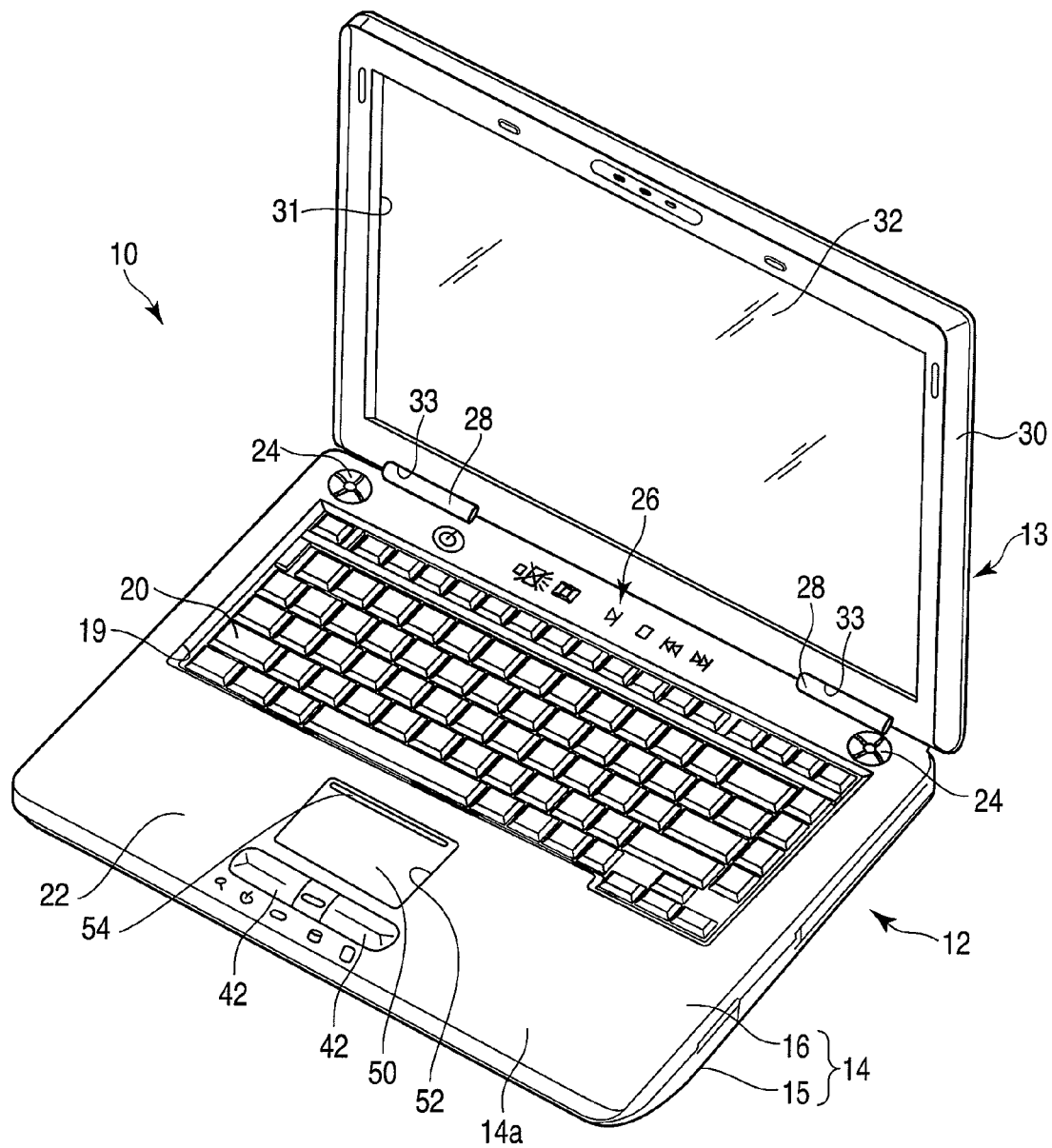
FIG. 1 is an exemplary perspective view showing a personal computer according to an embodiment of the present invention.

FIG. 1 shows an outside view of a notebook portable computer according to the embodiment, FIG. 2 shows a cabinet of the potable computer with a part thereof broken out, and FIG. 3 schematically shows an overall configuration of the portable computer.

As shown in FIGS. 1 and 2, a potable computer 10 has an apparatus main body 12 and a display unit 13 supported on the main body 12. The main body 12 has a cabinet 14. The cabinet 14 has a rectangular base 15 and an approximately rectangular cover 16 engaged with the base 15, and is formed in a flat box shape. An outside wall of the cabinet 14 has an outer surface 14a exposed outside and an inner surface 14b.

The cover 16 constituting the cabinet 14 is molded of a resin such as acrylic resin having an optical transparency and the surface thereof is covered with a surface layer (shade film) 18 having a shading property. As described later, a part of the surface layer 18 is formed transparent so that light can pass therethrough.

An approximately rectangular opening 19 is formed from a central portion to a rear half portion of the cover 16, and a keyboard 20 is provided in the opening so as to expose therefrom. A palm rest 22 is formed in an approximately front half portion of the cover 16. As described later, an operation region 50, which operates the pointing device, and click switches 42 are disposed in a central portion of the palm rest 22.

A pair of speakers 24 is disposed in a rear end portion of the cover 16, and an operation button display portion 26 is provided between these speakers. Further, a pair of leg portions 28 is disposed in the rear end portion of the cover 16 at intervals in a width direction of the cabinet 14.

The display unit 13 has a display housing 30 and a liquid crystal panel 32 accommodated in the display housing 30. A window portion 31 for display is formed on a front wall of the display housing 30. The window portion 31 has a size covering almost all the portion of the front wall, and a display screen of the liquid crystal panel 32 is exposed to the outside of the display housing 30 through the window portion 31.

The display housing 30 has a pair of coupling recesses 33 formed at an end thereof. These coupling recesses 33 are disposed at intervals in a width direction of the display housing 30 and engaged with the leg portions 28 of the cabinet 14, respectively. Then, the display housing 30 is pivotably supported to the cabinet 14 by hinges (not shown) disposed in the coupling recesses 33 and the leg portions 28.

With this arrangement, the display unit 13 can be pivoted between a closed position at which it is fallen down so as to cover an upper surface of the cabinet 14 including the palm rest 22 and the keyboard 20 from above and an open position at which it stands so as to expose the upper surface of the cabinet and the liquid crystal panel 32. Note that FIG. 1 shows the portable computer 1 in a state that the display unit 13 is pivoted to the open position.

As shown in FIGS. 1 and 2, a hard disk drive (HDD), an optical disc drive (ODD), and the like that are not shown are arranged in the cabinet 14 as well as a printed circuit board 34, a pointing device 40 as an input device and the like are arranged in the cabinet 14. The printed circuit board 34 and the HDD are fixed to a bottom wall of the base 15 of the cabinet 14 by screws.

Figures 4, 6:
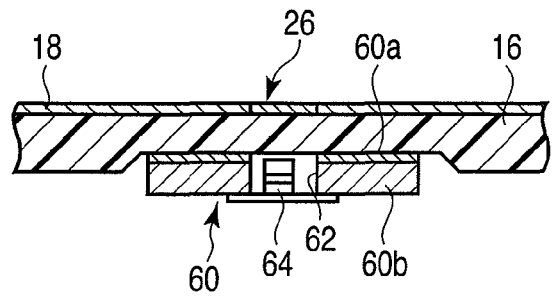
FIG. 4 is an exemplary sectional view taken along the line IV-IV of FIG. 3 and shows the operation button display unit and the touchpad of the personal computer.
FIG. 6 is an exemplary view showing a turned-on state of an LED in the personal computer.

As shown in FIGS. 2, 3, and 4, the pointing device 40 has an input sheet 44 and a printed circuit board 45 which constitutes a drive unit. The input sheet 44 is a detection sheet for sensing, for example, an electrostatic capacity and has one surface constituting a flat input surface 44a. The input sheet 44 has, for example, a rectangular shape, is bonded on one surface of the print substrate 45 having a rectangular shape likewise, and electrically connected to the print substrate 45. A drive IC 47, a connector 49, and the like are mounted on the other surface of the printed circuit board 45.

The pointing device 40 is arranged in the cabinet 14 in such a manner that the input surface 44a is overlapped on the inner surface 14b of the cabinet 14, that is, the input surface 44a is overlapped and bonded to a central portion of the inner surface of the palm rest 22 of the cover 16. At this time, the pointing device 40 is bonded to the inner surface of the cabinet 14 by, for example, a double-faced adhesive tape. A recessed portion 46 and a not shown positioning rib are formed in the central portion of the inner surface of the palm rest 22, and the pointing device 40 is bonded to a bottom surface of the recessed portion 46 in a state that it is positioned by the positioning rib.

In the potable computer 10, the cover 16 is formed of a resin, and an outer surface thereof is covered with the surface layer 18 having the shading property. Further, the pointing device 40 is arranged in the cabinet 14. Accordingly, a position of the input surface 44a cannot be visually confirmed from an outside of the cabinet 14. To cope with this problem, in the portable computer 10, an operation region 50 for input operation is formed in at least a part of the pointing device 40, for example, at a position that confronts approximately the overall surface of the input surface 44a of the outer surface 14a of the cabinet 14. That is, in the portable computer 10, since the input sheet 44 is overlapped on the central portion of the inner surface of the cover 16, the operation region 50 is formed in the central portion of the palm rest 22 which is the outer surface 14a of the cover 16. When a finger is moved on the operation region 50, a motion of the finger is sensed by the input sheet 44 of the pointing device 40, and a desired input operation is performed.

As shown in FIGS. 1, 3, and 4, operation button display portions 26 are arranged on the outer surface 14a of the cabinet 14, for example, at a rear end portion of the cover 16. The operation button display portion 26 includes, for example, a fast-forward button 26a, a rewind button 26b, a stop button 26c, a pause button 26d, which are used when a picture is displayed, an application start-up button 26e, and a sound mute and mode change button 26f serving as a setting switch button display portion, and these buttons are disposed side by side. These buttons have symbols formed in shapes corresponding thereto, respectively, and the respective symbols are formed by making a part of the surface layer 18, which covers the outer surface of the cover 16, transparent so that light passes therethrough. The respective buttons may be colorless and transparent or may be colored and transparent.

A touchpad 60 for detecting an input operation of the operation button display portion 26 is arranged in the cabinet 12 and is overlapped on the inner surface of the cover 16 in confrontation with the operation button display portion 26. The touchpad 60 has an elongated rectangular input sheet 60a, which corresponds to an overall size of the operation button display portion 26, and a printed circuit board 60b constituting a drive section. The printed circuit substrate 60b is formed in an elongated rectangular shape having a size corresponding to the input sheet 60a. The input sheet 60a is a detection sheet for sensing, for example, an electrostatic capacity and bonded on one surface of the printed circuit board 60b. The input sheet 60a of the touchpad 60 is overlapped and bonded on the inner surface of the cover 16.

In the input sheet 60a and the printed circuit board 60b, circular through holes 62 are formed at positions confronting the operation buttons 26a to 26f, respectively. The respective through holes 62 are formed in a diameter smaller than, for example, a fingertip of a user. LEDs 64 acting as light sources are disposed in these through holes 62, respectively, and electrically connected to the printed circuit board 60b. The LEDS 64 are disposed in confrontation with the operation buttons 26a to 26f and illuminate them by radiating light thereto from the inner surface of the cover 16. When the user touches any one of the operation buttons 26a to 26f from the outside of the cover 16, the touched operation button is detected by the input sheet 60a, and an input operation corresponding to the touched operation button is performed.

Figure 5:
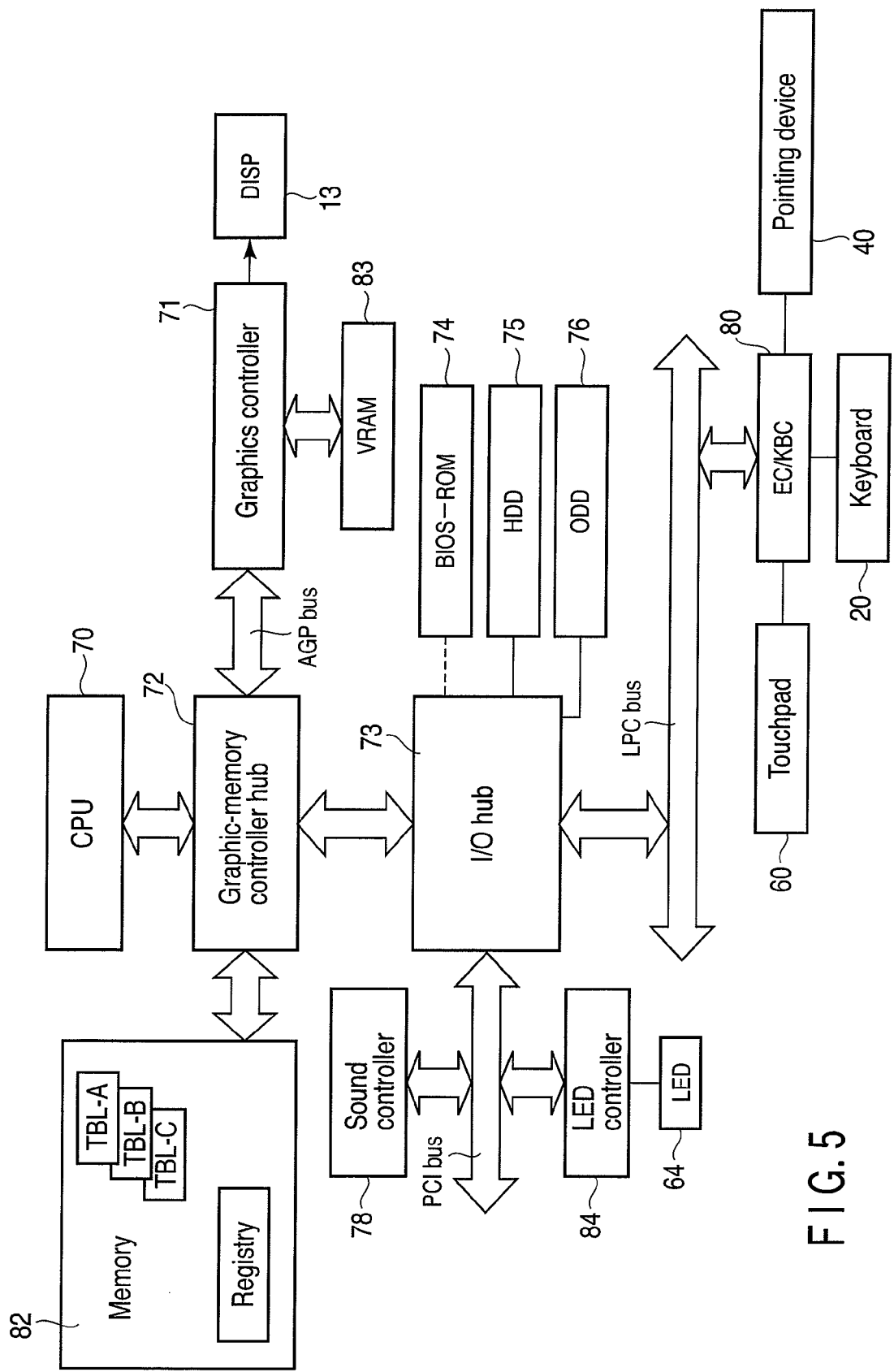
FIG. 5 is an exemplary block diagram schematically showing an overall configuration of the personal computer.

As shown in FIG. 5, the personal computer 10 has a CPU 70, a graphic-memory controller hub 72, a memory (main memory) 82, a graphics controller 71, a video RAM (VRAM) 83, an I/O hub 73, a BIOS-ROM 74, an HDD 75, an ODD 76, a sound controller 78, a keyboard embedded controller (EC/KBC) 80, an LED controller 84 that acts as a light source controller and controls light emission of the LEDs 64, and the keyboard 20, the display unit (DISP) 13, and the like described above.

The keyboard 20, the pointing device 40, and the touchpad 60 as the input device described above are connected to the EC/KBC 80. When the keyboard 20, the pointing device 40, and the touchpad 60 are operated, an event notification resulting from the operation is issued from the EC/KBC 80 and notified to a CPU 11.

The CPU 11 is provided to control an operation of the computer and performs various types of processes according to an operating system (OS), an application program, a utility program, and the like loaded from the HDD 75 to the main memory 82.

The graphics controller 71 controls display and drive of the display unit 13 under the control of the operating system performed by the CPU 11 as well as controls display and drive of various external display devices connected thereto through connection interfaces thereof such as CRT terminals, DVI terminals, TV terminals, and the like which are not shown.

The EC/KBC 80 is an integrated device including a microprocessor for realizing functions of a system power supply management, a keyboard controller, and the like and performs input processes of the pointing device 40 and the touchpad 60 in addition to the input control of the keyboard 20 here.

When any button of the operation button display portion 26 shown in FIGS. 1 and 3 is operated, that is, touched, the touched button is detected by the input sheet 60a of the touchpad 60, and a detection signal is sent to the EC/KBC 80. The EC/KBC 80 notifies a control command resulting from the detection signal to the CPU 11. The CPU 11 performs an operation corresponding to the touched operation button according to the notified control command.

When, for example, the application start-up button 26e is touched, the CPU 70 turns on and off a music player or an image player. When the mute and mode change button 26f is touched, the CPU 70 changes an illumination mode of an LED, that is, switches it by the LED controller 84. The LED controller 84 has a mode setting unit and can set a normally turned-on mode, in which the plurality of LEDs 64 are turned on at all times and a normally turned-off mode, in which the plurality of LEDs 64 are turned off at all times in response to a program. Each time the mute and mode change button 26f is touched, the normally turned-on mode and the normally turned-off mode are switched. The normally turned-off mode is selected when it is desired to turn off illumination in the vicinity of the display unit 13 when, for example, a picture is observed and listened, and the like.

Further, when the mute and mode change button 26f is touched while a sound is replayed, the CPU 70 lowers an output of a sound by the sound controller 78.

When the fast-forward button 26a, the rewind button 26b, the stop button 26c, and the pause button 26d are touched while music is replayed or a picture is displayed, the CPU 70 performs functions corresponding to the respective buttons by the sound controller 78 or the graphics controller 71.

In contrast, when any button of the operation button display portion 26 is touched and an input operation is detected, the LED controller 84 controls the illumination state of the LEDs 64 as described below.

As shown in FIG. 6, when any operation button of the operation button display portion 26 is touched in the normally turned-on state, that is, when it is detected by the touchpad 60 that a finger touches any operation button, the LED controller 84 places the LED 64 that confronts the touched operation button in a turned-off state for a predetermined time, for example, one second. When it is detected that the finger is removed from the operation button, the LED 64 is returned to an original state in a predetermined time, for example, in one second. That is, the LED 64 is returned from the turned-off state to the turned-on state. Note that the LED controller 84 has a time setting section for setting the predetermined time, during which the illumination state is changed, to an arbitrary time.

Further, when any operation button of the operation button display portion 26 is touched in a state that the normally turned-on mode is set, that is, when it is detected by the touchpad 60 that a finger touches any operation button, the LED controller 84 places the LED 64 that confronts the touched operation button in a turned-on state for a predetermined time, for example, one second. When it is detected that the finger is removed from the operation button, the LED 64 is returned to a turned-off state from the turned-on state in a predetermined time, for example, one second.

As described above, when any of the operation buttons of the operation button display portion 26 is subjected to an input operation, it can be fed back to the operator that the input operation is sensed, by changing illumination of the operation button, that is, by changing the illumination state of the LED 64. With this operation, since the operator can recognize that the operation button is effectively subjected to the input operation, the operator need not continuously press the operation buttons and can wait for the function corresponding to the operation button to be performed feeling a sense of relief.

According to the personal computer 10 constructed as described above, since it is not necessary to form openings and the like for accommodating the operation buttons in the cabinet by forming the operation button display portion 26 on the outer surface of the cabinet, design property can be improved. At the same time, usability and operability can be improved because a detected input operation can be fed back to the operator by changing the illumination state of the operation buttons in response to an input operation. With this arrangement, an electronic apparatus having improved operability and design property can be obtained.

While certain embodiments of the invention have been described, these embodiments have been presented by way of example only, and are not intended to limit the scope of the invention. Indeed, the novel methods and systems described herein may be embodied in a variety of forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

The electronic apparatus according to the present invention is not limited to a portable computer and can be widely applied to various types of electronic apparatuses such as an electronic notebook, PDA, and the like. The light source for illuminating the operation button display portion is not limited to the LED, and other light source such as a lamp may be used. A type and a function of the operation buttons that constitute the operation button display portion are not limited to the embodiment described above and can be variously selected.

What is claimed is:

1. An electronic apparatus comprising:
a cabinet comprising an outer surface and an inner surface;
a plurality of operation button displays on the outer surface of the cabinet;
a touchpad on the inner surface of the cabinet facing the operation button displays and configured to detect an input operation of the operation button displays;
a plurality of light sources on the inner surface side of the cabinet facing the operation button displays and configured to illuminate the respective operation button displays;
a light source controller configured to change an illumination state of the light source corresponding to the operation button display which makes an input operation to a first state for a predetermined time in response to the input operation of each operation button display and configured to return the illumination state to a second state.

2. The electronic apparatus of claim 1, wherein the light source controller comprises a mode setting module configured to set to either a first mode where the light sources are normally turned-on state or a second mode where the light sources are normally turned-off.

3. The electronic apparatus of claim 2, wherein the operation button displays are on the outer surface of the cabinet and comprise a set switching button displays configured to switch between the turn-on and turned-off modes of the light sources by the mode setting module.

4. The electronic apparatus of claim 3, wherein the set switching button displays comprise a function of sound mute for lowering a volume of a sound output.

5. The electronic apparatus of claim 1, wherein the light source controller comprises a time setting module configured to set the predetermined time.

6. The electronic apparatus of claim 1, wherein the cabinet comprises a resin of an optical transparency, and comprise a surface layer on the outer surface of the cabinet with a shading property, and portions of the surface layer facing to the operation button displays are transparent.

7. The electronic apparatus of claim 6, wherein the touchpad comprises a substrate and a detection sheet on the substrate overlapped on the inner surface of the cabinet configured to be the input surface, and the light sources confront the corresponding operation button display portions through openings formed in the detection sheet.

8. The electronic apparatus of claim 7, wherein the operation button displays comprise symbols on the surface layer configured to indicate functions of the operation button displays.

* * * * *